United States Patent [19]
Willis

[11] Patent Number: 5,646,626
[45] Date of Patent: Jul. 8, 1997

[54] METHOD AND APPARATUS FOR DIGITAL CORRELATION IN PSEUDORANDOM NOISE CODED SYSTEMS

[75] Inventor: Carl M. Willis, Mesa, Ariz.

[73] Assignee: Motorola, Inc., Schaumburg, Ill.

[21] Appl. No.: 593,103

[22] Filed: Jan. 30, 1996

[51] Int. Cl.⁶ ........................................ G01S 7/28
[52] U.S. Cl. ................... 342/189; 342/145; 342/194; 342/203
[58] Field of Search ..................... 342/189, 21, 145, 342/194, 195, 203

[56] References Cited

U.S. PATENT DOCUMENTS

| | | | |
|---|---|---|---|
| 4,042,925 | 8/1977 | Albanese et al. | 342/132 |
| 4,989,009 | 1/1991 | Zerkowitz | 342/145 |
| 5,084,901 | 1/1992 | Nagazumi | 375/204 |
| 5,120,997 | 6/1992 | Cantwell | 375/208 |
| 5,179,573 | 1/1993 | Paradise | 375/208 |
| 5,181,226 | 1/1993 | Cantwell | 375/200 |
| 5,293,168 | 3/1994 | Faulkner | 342/145 |
| 5,337,052 | 8/1994 | Lohrmann et al. | 342/68 |
| 5,497,160 | 3/1996 | Koehler et al. | 342/145 |
| 5,568,150 | 10/1996 | Taylor, Jr. et al. | 342/189 |

*Primary Examiner*—John B. Sotomayor
*Attorney, Agent, or Firm*—Jeffrey Nehr; Bradley J. Botsch, Sr.

[57] ABSTRACT

A pseudorandom noise coded system (100) compensates for imperfections, improving out of range rejection, and includes a digital correlator (200) having a first complex multiplier (202) receiving a sequence of sampled data words and a sequence of precomputed complex data words and producing a sequence of first complex product words. A second complex multiplier (204) receives the sequence of first complex product words and a precomputed constant word and produces a sequence of second complex product words. A complex multiplexer (206) receives a sequence of binary code states, and the sequences of first and second complex product words and produces a sequence of complex multiplexer output words formed as a replica of either the first or the second complex product words, depending on the binary code. A complex accumulator (208) receives the sequence of complex multiplexer output words and produces a complex accumulated sum word formed as a complex sum of the complex multiplexer output words.

31 Claims, 2 Drawing Sheets

METHOD AND APPARATUS FOR DIGITAL CORRELATION IN PSEUDORANDOM NOISE CODED SYSTEMS

CROSS REFERENCE TO RELATED APPLICATIONS

This patent application relates to a patent application Ser. No. 08/123,508 entitled "Method And Apparatus For Improved Auto-Correlation and Range Correlation in Pseudo-Random Noise Coded Systems" filed Sep. 17, 1993 with a common inventor and assigned to the same assignee as the present application and to patent application Ser. No. 08/593,962, entitled "Method and Apparatus for Controlling a Biphase Modulator to Improve Autocorrelation in Pseudorandom Noise Coded Systems", attorney docket number GE02751, by the same inventor and assigned to the same assignee as the present application.

FIELD OF THE INVENTION

This invention relates in general to the field of radar and communications systems, in particular to pseudorandom noise coded systems, and more particularly to pseudorandom noise coded systems which receive a biphase modulated waveform.

BACKGROUND OF THE INVENTION

In radar and communications systems it is sometimes important to process signals having a desired range delay while rejecting signals having an undesired range delay. The out-of-range rejection (ORR) performance is a measure of a system's ability to accomplish this requirement. Pseudorandom noise (PN) coded systems are often used to achieve acceptable ORR performance while maintaining low peak transmit power requirements.

Some PN coded systems receive a biphase modulated signal, the signal having been modulated with one of two phase states responsive to the logic state of a maximal length binary code sequence, with the relative phase difference between the two phase states being approximately 180 degrees. The properties of a maximal length binary code sequence are well known to those of ordinary skill in the art and include statistical properties which closely approximate a randomly generated binary code sequence in which each code state is equally likely. However, all maximal length binary code sequences are periodic and have an odd code length of L bits with $L=2^N-1$, where N is a positive integer. Furthermore, in any complete period, the number of occurrences of each code state differ by exactly one. Consequently, the ORR performance in PN coded systems is typically limited to $10 \log (1/L^2)$.

Many PN coded systems use analog components in the receive path to demodulate the received biphase modulated signal in a range correlation process. In such PN systems, the ORR performance is limited by imperfections in the analog components due in part to manufacturing tolerances. The imperfections are different in the analog components used to biphase modulate the transmitted signal than in the analog components used to demodulate the biphase modulated received signal. In an attempt to minimize these differences, some PN coded systems implement a biphase modulator used to demodulate the biphase modulated received signal. This biphase modulator is nearly identical to the biphase modulator used to biphase modulate the transmitted signal. However, component imperfections and differences persist between the biphase modulator in the transmit path and the biphase modulator(s) in the receive path(s), and these differences limit a more robust optimization of the ORR performance.

What is needed to optimize the ORR performance is a digital correlation technique that includes a method and apparatus for compensating imperfections in the biphase modulator in the transmit path and a digital correlator incorporating the compensating means to replace the biphase modulator(s) in the receive path(s). In PN-coded systems requiring multiple channels, with each channel responsive to a signal having a different range delay, what is needed is a digital correlation technique which reduces the amount of physical hardware required to partition the target detection space, thereby reducing cost and packaging size.

What is needed in PN-coded systems that perform range correlation using digital circuitry is a method and apparatus for performing the range correlation task and the spectral processing task concurrently, thereby reducing the size, complexity, and cost of PN coded systems, particularly in applications requiring a large number of range resolution cells. In a PN-coded system using digital Fourier Transform spectral processing, what is needed is a means for independently setting the attributes of an optimal number of spectral processing channels to provide fine Doppler frequency resolution at the lower end of the frequency spectrum where longer dwell times are acceptable and to provide for short dwell times at the upper end of the frequency spectrum where coarser Doppler frequency resolution is acceptable.

DETAILED DESCRIPTION OF THE DRAWINGS

Patent application Ser. No. 08/123,508 entitled "Method And Apparatus For Improved Auto-Correlation and Range Correlation in Pseudo-Random Noise Coded Systems" filed Sep. 17, 1993 with a common inventor and assigned to the same assignee as the present application (and herein incorporated by reference) relates in part to a method and apparatus for controlling the relative phase difference between the two phase states of a biphase modulator. The relative phase difference is controlled using a feedback control loop to maintain a specific desired relative phase difference offset slightly from 180 degrees, for the purpose of improving the ORR performance.

An additional pending patent application entitled "Method and Apparatus for Controlling a Biphase Modulator to Improve Autocorrelation in Pseudorandom Noise Coded Systems", application Ser. No. 08/593,962, attorney docket number GE02751, by the same inventor and assigned to the same assignee as the present application (and herein incorporated by reference), discloses a more generalized method and apparatus for controlling either the relative amplitude ratio between the two phase states of a biphase modulator or the relative phase difference, or both the relative amplitude ratio and the relative phase difference by means of a feedback control loop. Infinite rejection of unwanted out-of-range signals is theoretically possible using such techniques, assuming that the transmitted biphase modulated signal is properly demodulated. A purpose of the present invention is to digitally demodulate the received signal such that perfect ORR performance is achieved when the techniques disclosed in the above-referenced patent application are implemented in the biphase modulator discussed therein.

Although significant improvements in ORR are achieved with the methods of the above referenced patent application using a biphase modulator in the receive path to properly demodulate the biphase modulated received signal as discussed therein, practical limitations of analog components prevent perfect ORR performance from being realized. Each analog biphase modulator in a PN system has imperfections and manufacturing tolerances resulting in differences between the biphase modulator in the transmit path and the biphase modulator(s) used for range correlation in the receive path(s) which limit the ORR performance that can be achieved. Although a desired value can be specified including a manufacturing tolerance, the actual value realized by the manufacturing process will vary from part to part and further variations may occur over time and environmental changes such as temperature. These variations limit the actual ORR performance that can be achieved. A further purpose of the present invention is to digitally demodulate the received signal so as to compensate for the imperfections and manufacturing tolerances associated with the biphase modulator in the transmit path, thereby more closely approaching perfect ORR performance in the PN system.

Many PN coded systems require multiple channels each responsive to a signal having a different range delay. For example, a PN coded radar system may require multiple range channels to partition the target detection space in the time dimension corresponding to target range. Further, a PN coded radar system often must also partition the target detection space in the frequency dimension corresponding to target Doppler or range rate. Some PN coded radar systems may also require direction finding accomplished by further partitioning the target detection space in angular dimensions. A characteristic of PN coded systems which require target location in a large dimensional detection space is that much physical hardware is typically required with attendant cost and packaging concerns.

PN coded systems which perform range correlation using analog circuitry necessarily first complete the range correlation task partitioning the target detection space in the range dimension. This range correlation task is followed sequentially by the task of spectral processing to partition the detection space in the frequency dimension. Such partitioning is necessary because the information in the wide band PN modulated signal is needed for range correlation and the spectral processing task is inherently band limiting. Thus, the wide band range correlation task must be completed before the band limiting spectral processing task is initiated. For many applications, this necessitates use of a large amount of physical hardware because separate range channels are required for each range resolution cell in the range dimension, and subsequently each range channel requires separate spectral processing to partition each range resolution cell in the frequency dimension. Thus, larger physical size, hardware complexity, cost, and computational throughput is often required for PN coded systems which perform range correlation with analog circuitry.

PN coded systems which perform range correlation using digital circuitry also currently complete the range correlation task prior to initiating the spectral processing task. The biphase modulated received signal is sent to a plurality of digital range correlators, each of which completes the range correlation task prior to spectral processing for each of the plurality of range channels.

In conventional PN radar systems, a digital Fast Fourier Transform (FFT) processor is commonly used to partition the received signal space in the frequency dimension. But, the linear spacing and uniform width of the FFT frequency bins presents significant limitations in many applications. For example, in a PN radar system, the width of the FFT Doppler frequency bins can be chosen to provide fine frequency resolution to discriminate slow moving targets from in-range clutter (requires a long FFT dwell time). A concurrent requirement to detect fast moving targets as well as slow moving targets can dictate a high sample rate and a large number of FFT Doppler frequency bins. However, the fast moving target may require a quick reaction upon detection, which dictates a shorter FFT dwell time and attendant coarse Doppler frequency resolution acceptable for the higher speed targets( but unacceptable for slower speed targets). Thus, there is a conflict in the requirements between the lower and higher frequencies that often leads to a performance compromise. Also, the resulting number of FFT frequency bins required is much larger than would be dictated by more optimal system requirements, because the number of linearly spaced FFT frequency bins is dictated by the fine Doppler frequency resolution requirement at the lower end of the frequency spectrum and the maximum Doppler frequency required to detect the fastest target (which defines the upper end of the frequency spectrum). Further, the number of FFT frequency bins is limited to powers of two.

Figure 1:
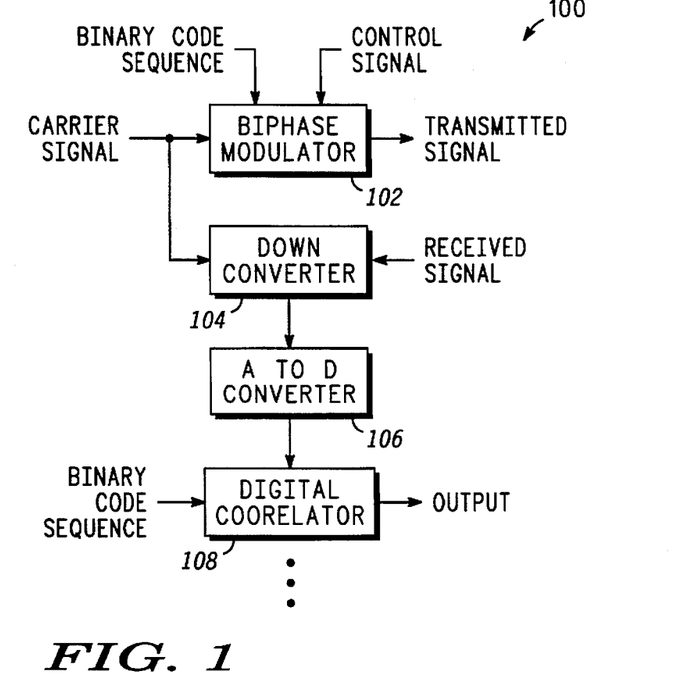
FIG. 1 is a block diagram of a PN radar system incorporating a digital correlator in accordance with a preferred embodiment of the invention.

FIG. 1 shows a block diagram of a PN system 100, representing a radar system in this example, including a digital correlator, in accordance with a preferred embodiment of the present invention. FIG. 1 illustrates elements in a PN coded digital correlation system implementation of PN radar to better illustrate embodiments of the digital correlator shown in FIG. 2, FIG. 3, and FIG. 4. There are many possible variations of the PN radar system shown in FIG. 1. As shown, FIG. 1 emphasizes the implementation of embodiments including the preferred embodiment of the digital correlator shown as FIG. 2, and implementation of embodiments including the preferred embodiment of the digital correlator shown as FIG. 3. The FIG. 1 block diagram can also apply to the embodiments of the digital correlator depicted in FIG. 4.

The example PN radar system 100 of FIG. 1 includes a biphase modulator 102 used to biphase modulate the carrier signal responsive to a binary code sequence, a down converter 104 used to down convert the received biphase modulated signal from an RF center frequency to a baseband video center frequency, an analog to digital converter 106 used to digitize the biphase modulated baseband signal, and at least one digital correlator 108. Preferably, there are a plurality of digital correlators, with each digital correlator being associated with a different Doppler frequency channel, and each digital correlator preferably having a plurality of outputs each output associated with a different range channel.

In the PN radar system of FIG. 1, the biphase modulator 102 includes a control signal input for receiving a control signal, an RF input for receiving a carrier signal, a code input for receiving a sequence of binary code states, and an RF output. A transmitted signal is formed at the RF output by phase modulating the carrier signal with one of two phase states responsive to the binary code state and the control signal. The transmitted biphase modulated signal characteristics are modified in response to the control signal.

Biphase modulator 102 in FIG. 1 is of the type referred to above in the above-referenced patent applications. Biphase modulator 102 receives a control signal which is used to adjust the relative phase difference and/or the relative amplitude ratio of the biphase modulator 102. While the embodiments of the present invention shown in FIGS. 2–4 do not require a biphase modulator having a control signal input port, the preferred embodiment discussed in conjunction with FIG. 2 and FIG. 3 assumes that a biphase modulator having a control signal input is used to generate the biphase modulated signal received at the input to the digital correlator 108. The embodiments discussed in conjunction with FIG. 4 assume, but do not require, that the biphase modulator used to generate the biphase modulated signal received at the input to the digital correlator 108 is of a design that does not include a control signal input port. The biphase modulator 102 in FIG. 1 is used to impart one of two phase states onto the continuously transmitted carrier signal input to it in response to one of two code states associated with the binary code sequence, also input into the biphase modulator 102.

In a conventional biphase modulator, the relative phase difference between the two phase states is nominally 180 degrees and the relative amplitude ratio between the two phase states is desirably equal to one (i.e., the amplitude of the biphase modulated signal at the output of the biphase modulator 102 is desirably the same for the two phase states). The above-referenced patent applications disclose that the ORR performance can be improved if the relative phase difference is offset slightly from 180 degrees and/or the relative amplitude ratio is offset slightly from one. The biphase modulator 102 shown in FIG. 1 has a control signal input for receiving a control signal used as a control element to adjust either the relative phase difference or the relative amplitude ratio to improve the ORR performance.

Figure 2:
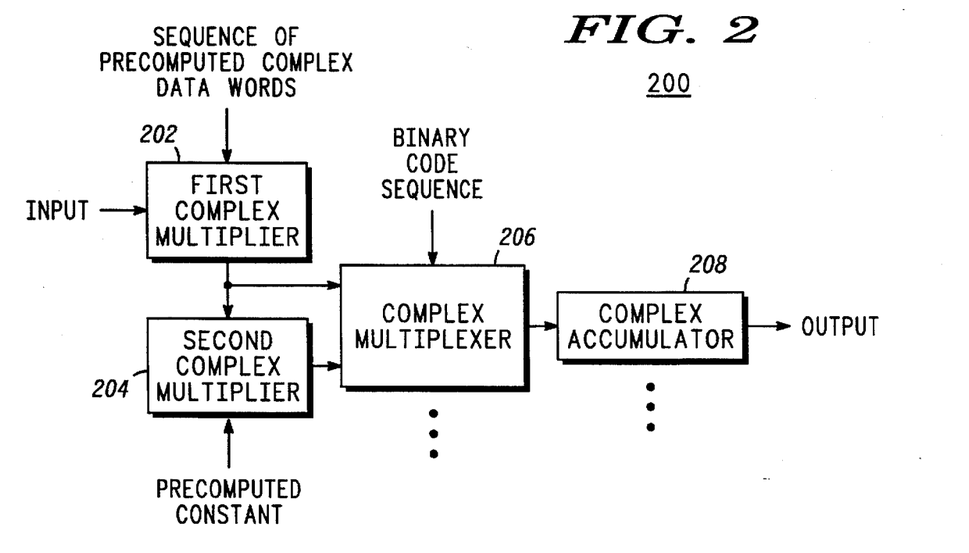
FIG. 2 is a block diagram illustrating a preferred embodiment of a digital correlator suitable for use in a PN radar system such as illustrated in FIG. 1.
Figure 3:
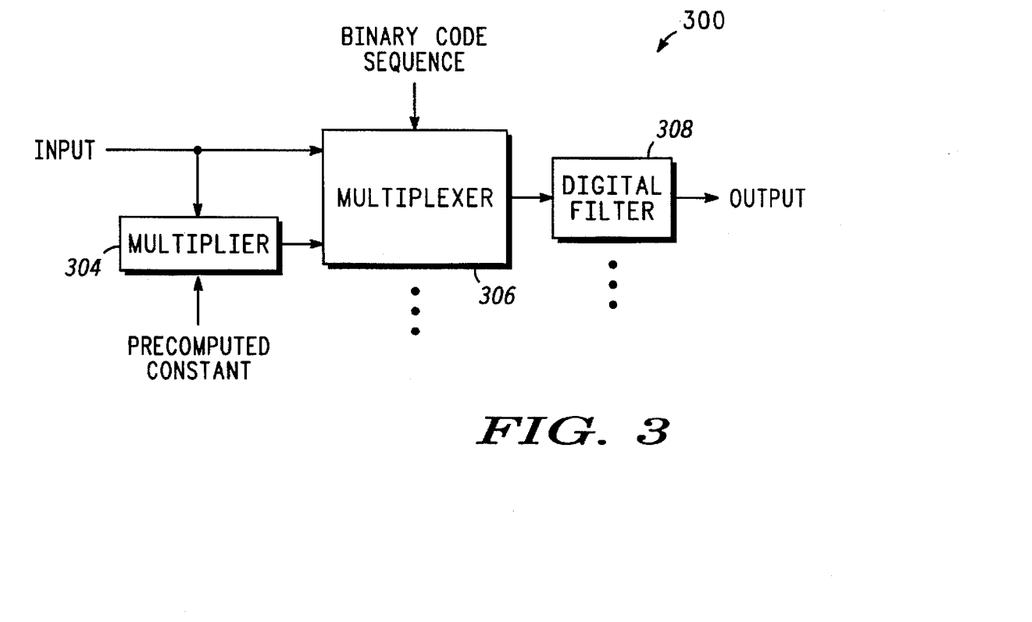
FIG. 3 is a block diagram illustrating elements of a preferred embodiment of a digital correlator in accordance with a preferred embodiment of invention.

The digital correlator embodiments illustrated in FIGS. 2 and 3 assume that the relative phase difference between the two phase states of the biphase modulator 102 is intentionally offset slightly from 180 degrees and/or that the relative amplitude ratio is intentionally offset slightly from 1. Preferably, but not necessarily, this offset is effected responsive to an external control signal. The desired values of these parameters can be compensated by the embodiments of the digital correlator discussed in FIGS. 2 and 3. It is further assumed that unintentional errors in the values of these parameters from the desired values can be present which can also be compensated by the embodiments of the digital correlator discussed in FIGS. 2 and 3.

Figure 4:
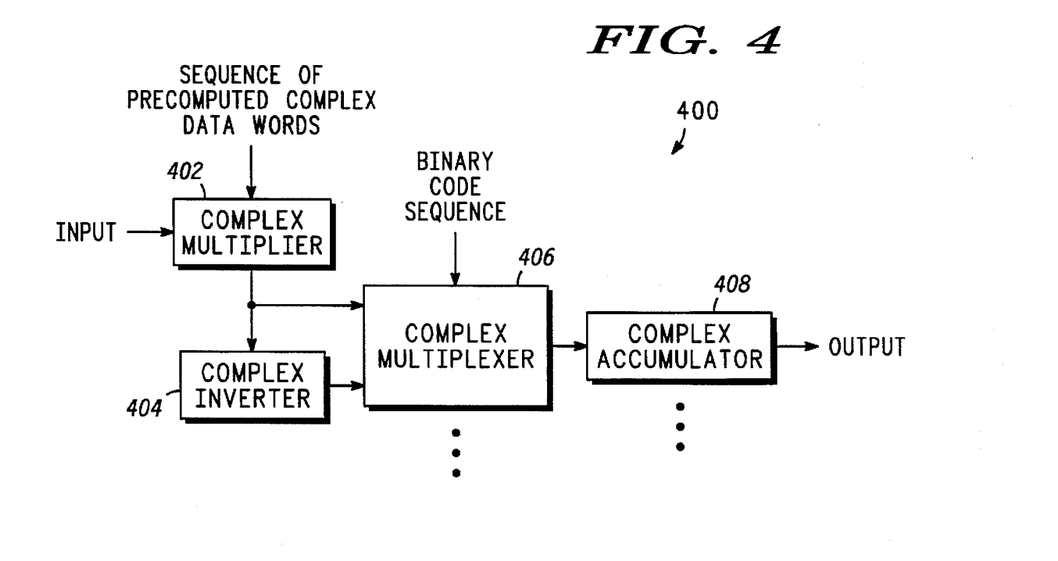
FIG. 4 is a block diagram of a preferred embodiment of a digital correlator implemented with a PN radar system emphasizing a minimal hardware complexity in accordance with the invention.

The embodiments discussed in conjunction with FIG. 4 generally, though not necessarily, assume a biphase modulator 102 which does not include a control signal input. For the FIG. 4 embodiment, the relative phase difference is nominally 180 degrees and the relative amplitude ratio is nominally 1.

Returning to the PN radar system illustrated in FIG. 1, the down converter 104 shown includes an RF input for receiving a received signal, which is a Doppler shifted version of the transmitted signal. The down converter 104 further includes an LO input for receiving the carrier signal and a baseband output for producing a baseband signal by means of mixing the received signal with the carrier signal. The down converter 104 can be either a real down converter in which only one signal appears at the baseband output port, or a quadrature down converter in which two signals in phase quadrature with each other appear at the baseband output. One of the signals is identified as the in-phase or I signal, and the other signal is identified as the quadrature phase, or Q signal, according to conventions known to the art.

Either a real down converter 104 or a quadrature down converter 104 can be used in conjunction with each of the embodiments shown in FIG. 2, FIG. 3, and FIG. 4. However, the preferred embodiment assumes that a quadrature down converter 104 is used, providing both an I signal and a Q signal to the input of the digital correlator 108 in FIG. 1.

In the PN radar system of FIG. 1, the analog to digital converter 106 includes an analog input coupled to the baseband output of the down converter 104 for receiving the baseband signal and a digital output for producing a sequence of sampled data words. If a real down converter 104 is implemented, then the analog to digital converter 106 only digitizes the single output signal appearing at the baseband output. If a quadrature down converter 104 is implemented, then the analog to digital converter 106 digitizes both the I signal and the Q signal appearing at the baseband output. The preferred embodiment assumes that both a digitized I signal and a digitized Q signal are received at the input of the digital correlator 108. The sample rate at which sampled data words are produced by the analog to digital converter 106 should be synchronized with the binary code sequence received at the code input of the biphase modulator 102. Preferably, one sampled data word is produced for each code state of the binary code sequence, which for the preferred embodiment is interpreted as one digitized sample of the I signal and one digitized sample of the Q signal. Preferably, the I signal and the Q signal are sampled at the same instance in time.

The digital correlator in the PN radar system of FIG. 1 can be any of the types discussed in conjunction with FIG. 2, FIG. 3, and FIG. 4. The preferred embodiment is discussed in conjunction with FIGS. 2 and 3. The binary code sequence received by the digital correlator 108 can be synchronized with the binary code sequence received by the biphase modulator 102 such that a binary code sequence is received by the digital correlator 108 at the same rate as the binary code sequence is received by the biphase modulator 102 and such that the binary code sequence received by the digital correlator 108 is a delayed replica of the binary code sequence received by the biphase modulator 102.

There must be at least one digital correlator 108 in the example PN radar system shown as FIG. 1. Preferably, however, there are a plurality of digital correlators 108 each associated with a different Doppler frequency channel, as indicated by the ellipsis in FIG. 1. Each of the plurality of digital correlators 108 can produce a plurality of outputs, where each output is associated with a different range channel and with a different amount of delay of the code sequence received by the digital correlator 108. Preferably, the center Doppler frequency and the Doppler frequency resolution is independently set for each Doppler frequency channel corresponding to each of the plurality of digital correlators 108 thereby providing flexibility in partitioning the target detection space in the Doppler frequency dimension.

FIG. 2 shows a block diagram of a preferred embodiment of a digital correlator 200 for a pseudorandom noise coded system. The digital correlator 200 includes a first complex multiplier 202, a second complex multiplier 204, at least one complex multiplexer 206, and at least one complex accumulator 208. There is one complex accumulator 208 corresponding to each complex multiplexer 206. Preferably, there is a plurality of complex multiplexers 206 and corresponding complex accumulators 208, as indicated by the ellipsis in FIG. 2, each associated with a different range channel.

The first complex multiplier 202 in FIG. 2 includes a first input for receiving a sequence of sampled data words, a second input for receiving a sequence of precomputed complex data words, and an output for producing a sequence of first complex product words formed as a product of the sampled data words multiplied times the precomputed complex data word. Each of the first complex product words can form a complex number comprising a real part and an imaginary part, the real part being a digital word having at least two bits and the imaginary part being a digital word having at least two bits. Each of the precomputed complex data words also forms a complex number comprising a real part having at least two bits and an imaginary part having at least two bits. In a preferred embodiment, the sequence of sampled data words is formed by sampling a received biphase modulated analog signal and digitizing each sample with a component such as an analog to digital converter (for example, analog to digital converter 106 in FIG. 1). The digitizing process of the analog to digital converter is not shown in FIG. 2. The resulting sequence of sampled data words, shown simply as input in FIG. 2, is received at the first input of the first complex multiplier 202. Each sampled data word forms either a real number having at least two bits or a complex number comprising a real part having at least two bits and an imaginary part having at least two bits, depending on which of several possible embodiments of the invention is implemented. In a preferred embodiment of the invention, each sampled data word forms a complex number.

In a preferred embodiment of the invention, the sequence of precomputed complex data words is precomputed and stored in a digital memory array not shown in FIG. 2. Each of the precomputed complex data words can include a real part and an imaginary part. The sequence of precomputed complex data words is retrieved from memory in sequence during operation, although there are a variety of ways in which the sequence of precomputed complex data words can be formed. In the preferred embodiment, the sequence of precomputed complex data words is stored in the digital memory array as the product of a windowing function and a complex discrete Fourier transform (DFT) kernel vector known in the art. The windowing function can be any windowing function used to reduce side lobes such as a Blackman-Harris windowing function or a Hanning windowing function or any of a number of windowing functions having similar properties.

A preferred embodiment of the digital correlator shown in FIG. 2 uses a Blackman-Harris windowing function. It is known in the art that a band pass spectral filter can be implemented by accumulating the sum of the products of a sequence of sampled input data words times a windowed complex DFT kernel vector. In such a band pass spectral filter, the spectral width of the band pass filter which sets the Doppler frequency resolution is primarily determined by the time over which the products are accumulated, and the center Doppler frequency of the band pass filter is primarily determined by a center frequency term used to compute the DFT kernel vector. In the preferred embodiment, the real part of the complex DFF kernel vector can be precomputed as $\cos(2\pi F_d i T_A)$, and the imaginary part of the complex DFT kernel vector can be precomputed as $\sin(2\pi F_d i T_A)$, where $F_d$ is the center frequency term, denoting the center Doppler frequency; i is the index of the current element of the stored memory array; and $T_A$ is the sample interval or equivalently, the time between each of the sequence of data sample words received at the first input of the first complex multiplier 202.

The second complex multiplier 204 in FIG. 2 includes a first input coupled to the output of the first complex multiplier 202 for receiving the sequence of first complex product words which appear at the output of the first complex multiplier 202. Each of the first complex product words includes a real part and an imaginary part. Complex multiplier 204 also includes a second input for receiving a precomputed constant word and an output for producing a sequence of second complex product words formed as a product of the first complex product word multiplied times the precomputed constant word. Second complex product words are formed as complex numbers comprising a real part having at least two bits and an imaginary part having at least two bits. The precomputed constant word can be formed as either a real number having at least two bits or a complex number comprising a real part having at least two bits and an imaginary part having at least two bits, depending on which of the embodiments of the invention is implemented. Preferably, the precomputed constant word is formed as a complex number.

The purpose of the precomputed constant word is to compensate for the values of relative phase difference and/or the relative amplitude ratio realized in the biphase modulator (biphase modulator 102 in FIG. 1), thereby improving the ORR performance. The desired values of the relative phase difference and the relative amplitude ratio resulting in theoretically perfect ORR performance can be determined as disclosed in the above-referenced patent applications. Unintentional errors in the values of these parameters actually realized by the biphase modulator (biphase modulator 102 in FIG. 1) and other imperfections can also be compensated by appropriate modifications of the value of the precomputed constant word. In general, the optimal value of the complex constant can be determined empirically by, for example, measuring the ORR performance in an automated test sequence in which a computer controls an automated range simulator and monitors the ORR performance as a function of the complex constant to automatically determine an optimal value. In a preferred embodiment, the biphase modulator 102 that generates the received biphase modulated signal is assumed to implement a feedback control loop to maintain a desired condition for the values of the relative phase difference and/or the relative amplitude ratio as disclosed in the above-referenced patent applications.

If the control loop on the biphase modulator is operated as disclosed and if the values of the relative phase difference, $\phi_A$, and a relative amplitude ratio, A, are known, then the value of the complex constant can be computed as:

complex constant=$A \cos(-\phi_A)+j A \sin(-\phi_A)$   Equation 1

If the control loop on the biphase modulator (for example 102) is operated as disclosed but the values of the relative phase difference, $\phi_A$, and a relative amplitude ratio, A, are not known, then the values of $\phi_A$ and A can be determined empirically. The value of the complex constant can then be computed from equation 1.

The empirical determination of $\phi_A$ and A is simplified under the assumption that the control loop on the biphase modulator is operated as disclosed because these parameter values then approximately satisfy the following:

$$\phi_A = \pi \pm \cos^{-1}\left[\frac{A^2(L+1)^2 + (L^2 - 6L + 1)}{2A(L^2 - 1)}\right] \quad \text{Equation 2}$$

where $$\frac{(L-1) - 2\sqrt{L}}{L+1} \leq A \leq \frac{(L-1) + \sqrt{L}}{L+1}$$

as disclosed in the above-referenced patent applications. The value of the precomputed constant word determined by equation 1 which empirically optimizes the ORR performance is thus known to lie in the vicinity of values dictated by equation 2. The precomputed constant word is in general a complex number having a real part and an imaginary part. However, if the control loop on the biphase modulator 102 is operated as disclosed and the biphase modulator 102 is designed such that the value of the relative phase difference, $\phi_A$, is very nearly equal to $\pi$, then the imaginary part of the precomputed constant word is nearly equal to zero and can, in some embodiments, be neglected such that the precomputed constant word is a real number having only a real part. In a preferred embodiment, the precomputed constant word is a complex number to allow for more precise compensation of the imperfections in the biphase modulator 102.

The convention used to define the value of A is further explained below. All maximal length PN code sequences have an odd numbered integer code length, L. The properties of the PN code sequence are such that the number of occurrences of each of the two binary code states differ by exactly 1 over a complete code period. That is, one of the two code states defined here as the excess code state occurs $(L+1)/2$ times, and the other code state defined here as the deficient code state occurs $(L-1)/2$ times in one code period. The parameter, A, can be defined as the peak sine wave voltage amplitude at the output of the biphase modulator 102 when the excess code state is exercised, divided by the peak sine wave voltage amplitude when the deficient code state is exercised.

The embodiment of the digital correlator 200 shown as FIG. 2 includes at least one complex multiplexer 206. Each complex multiplexer 206 includes a code input for receiving a delayed replica of the sequence of binary code states, a first input coupled to the output of the first complex multiplier 202 for receiving the sequence of first complex product words, a second input coupled to the output of the second complex multiplier 204 for receiving the sequence of second complex product words, and an output for producing a sequence of complex multiplexer output words. The complex multiplexer output words are formed as a replica of either the first complex product words or the second complex product words, depending on the binary code state.

An embodiment of the digital correlator 200 shown as FIG. 2 includes at least one complex accumulator 208, there being one complex accumulator 208 for each complex multiplexer 206. Each complex accumulator 208 includes an input coupled to the output of the complex multiplexer 206 for receiving the sequence of complex multiplexer output words. Each complex accumulator 208 also includes an output for producing a complex accumulated sum word formed as a complex sum of a plurality of complex multiplexer output words received in sequence.

In a preferred embodiment of the invention, the digital correlator 200 in FIG. 2 includes a plurality of complex multiplexers 206 and an equal number of corresponding complex accumulators 208. Each complex multiplexer 206 and corresponding complex accumulator 208 is associated with a different range channel as determined by the delay of the binary code sequence received by the associated complex multiplexer 206.

In the preferred embodiment illustrated in FIG. 2, the spectral processing task is accomplished by accumulating the sum of products, the products being performed by the first complex multiplier 202 and the accumulation being performed by the complex accumulator 208. The range correlation task is initiated with the second complex multiplier 204. For the preferred embodiment, the value of the precomputed constant compensates for the value of the relative phase difference and/or the relative amplitude ratio as well as for imperfections in the biphase modulator 102 in effect modulating the phase and amplitude of the received biphase modulated signal. The range correlation task is continued in the complex multiplexer(s) 206 which in effect biphase modulates the received signal by selecting one of two signals responsive to the state of the binary code sequence received by the complex multiplexer(s) 206. The range correlation task is completed by accumulating a sum of an integer number of the sequence of complex multiplexer output words, the integer number preferably being equal to nL where n is a positive integer and L is the code length of the periodic binary code sequence received by the complex multiplexer(s) 206. Thus, the spectral processing task is initiated in the first complex multiplier 202. However, prior to completing the spectral processing task in the complex accumulator(s) 208, the range correlation task is initiated by the second complex multiplier 204. Both the spectral processing task and the range correlation task are then concurrently completed in the complex accumulator(s) 208, with each complex accumulator being associated with a different range channel.

In a preferred embodiment of a pseudorandom noise coded digital correlation system 100, the digital correlator 200 is one of a plurality of digital correlators, each associated with a different Doppler frequency channel. For each Doppler frequency channel, the center Doppler frequency is independently set by the calculated values of the sequence of precomputed complex data words received by the first complex multiplier 202, while the Doppler frequency resolution is independently set by the length of the sequence of precomputed complex data words, which corresponds to the dwell time. The complex accumulator(s) 208 for each digital correlator 200 are initialized to zero at the beginning of the sequence of precomputed complex data words and accumulate a complex sum over the entire sequence of precomputed complex data words to produce a complex accumulated sum word at the output of the complex accumulator(s) 208 at the conclusion of the summation. Preferably, the number of precomputed complex data words in the sequence is equal to nL (where n is a positive integer and L is the code length of the periodic binary code sequence received by the complex multiplexer(s) 206) because the complex accumulator(s) 208 concurrently accumulate a sum for both the spectral processing task and the range correlation task. However, although this constraint is preferable, it is not necessary due to the windowing function used to compute the values of the sequence of precomputed complex data words.

In a preferred embodiment of the present invention, the first complex multiplier 202, the second complex multiplier 204, a plurality of complex multiplexers 206, and a plurality complex accumulators 208 are all designed and fabricated to reside on a single application-specific integrated circuit (ASIC) chip. However, there are a wide variety of ways in which the processing tasks can be partitioned in hardware.

FIG. 3 shows a block diagram of a preferred embodiment of a digital correlator 300 for a pseudorandom noise coded system. The digital correlator 300 includes a multiplier 304, at least one multiplexer 306, and at least one digital filter 308 (with one digital filter 308 corresponding to each multiplexer 306). Preferably, there are a plurality of multiplexers 306 and corresponding digital filters 308, as indicated by the ellipses in FIG. 3, each associated with a different range channel. Preferably, the digital filter 308 is implemented as an accumulator.

Multiplier 304 in FIG. 3 includes a first input for receiving a sequence of sampled data words, a second input for receiving a precomputed constant word, and an output for producing a sequence of product words formed as a product of the sampled data word multiplied times the precomputed constant word. The precomputed constant word forms either a real number having at least two bits, or a complex number comprising a real part having at least two bits and an imaginary part having at least two bits. The purpose of the precomputed constant is to compensate for the values of the relative phase difference and/or the relative amplitude ratio of the biphase modulator 102, and preferably also for imperfections in the biphase modulator 102 as explained in conjunction with FIG. 2 and equations 1 and 2 above. In a preferred embodiment, the precomputed constant word forms a complex number. Each sampled data word forms either a real number having at least two bits, or a complex number comprising a real part having at least two bits and an imaginary part having at least two bits. However, if the precomputed complex constant word forms a complex number as in the preferred embodiment then each sampled data word also necessarily forms a complex number.

Each multiplexer 306 in FIG. 3 includes a code input for receiving a sequence of binary code states, a first input coupled to the input of the multiplier 304 for receiving the sequence of sampled data words, and a second input coupled to the output of the multiplier for receiving the sequence of product words. Each multiplexer 306 also includes an output for producing a sequence of multiplexer output words formed as a replica of either the sampled data word or the product word, depending on the binary code state. Each multiplexer 306 can be either a real multiplexer or a complex multiplexer, depending on whether the sampled data word and the product word are real or complex. Preferably, each multiplexer is a complex multiplexer.

Each digital filter 308 in FIG. 3 includes an input coupled to the output of the corresponding multiplexer for receiving the sequence of multiplexer output words. Each digital filter 308 also includes an output for producing a filter output word. In a preferred embodiment, the digital filter 308 is implemented as an accumulator. Each digital filter 308 can be either a real digital filter 308 or a complex digital filter 308 depending on whether the corresponding multiplexer 306 is a real multiplexer or a complex multiplexer. Preferably, each digital filter 308 and corresponding multiplexer are complex, meaning that the sampled data word and the product word presented at the first and second input of the multiplexer are both complex (having a real and imaginary part) and that the resulting multiplexer output words are complex. In a preferred embodiment, the real and imaginary parts are accumulated separately to form the accumulated sum of a sequence of complex numbers. Preferably, the complex sum is accumulated over an integer number equal to nL, where n is a positive integer and L is the code length of the periodic binary code sequence received by the complex multiplexer(s) 306.

FIG. 4 shows a block diagram of a preferred embodiment of a digital correlator 400 for a pseudorandom noise coded system. The digital correlator 400 includes a complex multiplier 402, a complex inverter 404, at least one complex multiplexer 406, and at least one complex accumulator 408 (with one complex accumulator 408 corresponding to each complex multiplexer 406). In a preferred embodiment of the invention, the digital correlator 400 includes a plurality of complex multiplexers 406 and an equal number of corresponding complex accumulators 408, as indicated by the ellipses in FIG. 4. Each complex multiplexer 406 and corresponding complex accumulator are associated with a different range channel as determined by the amount of delay in the binary code sequence received by the associated complex multiplexer 406.

In general, the method and apparatus illustrated in FIG. 4 is implemented using less complex hardware than the block diagram shown in FIG. 2, and in general is preferred for applications where hardware complexity is a major issue. However, a preferred embodiment of method and apparatus shown in FIG. 4 does not include features for significantly improving the ORR performance such as are found in the preferred embodiment of the block diagram shown in FIG. 2. In general, the method and apparatus illustrated in the block diagram shown in FIG. 2 is preferred for applications where the ORR performance is a major issue.

When an embodiment illustrated by FIG. 4 is implemented, the biphase modulator 102 shown in FIG. 1 preferably does not include a control signal input, because a less complex biphase modulator would be implemented. Such a biphase modulator 102 would desirably have a relative phase difference equal to 180 degrees and a relative amplitude ratio equal to 1.

In FIG. 4, complex multiplier 402 includes a first input for receiving a sequence of sampled data words and a second input for receiving a sequence of precomputed complex data words. Complex multiplier 402 also includes an output for producing a sequence of complex product words formed as a product of the sampled data word multiplied times the precomputed complex data word.

The complex multiplier 402 shown in FIG. 4 functions similarly to the first complex multiplier 202 shown in FIG. 2. The values of the sequence of precomputed complex data words shown in FIG. 4 is determined in like manner as the sequence of precomputed complex data words shown in FIG. 2. Each of the complex product words forms a complex number comprising a real part and an imaginary part, the real part being a digital word having at least two bits and the imaginary part being a digital word having at least two bits. Each sampled data word forms either a real number having at least two bits or a complex number comprising a real part having at least two bits and an imaginary part having at least two bits, depending on which of several possible embodiments of the invention is implemented. In a preferred embodiment of the invention, each sampled data word forms a complex number.

The complex inverter 404 in FIG. 4 includes an input coupled to the output of the complex multiplier 402 for receiving the sequence of complex product words each having a real part and an imaginary part. Complex inverter 404 also includes an output for producing a sequence of complex inverter output words, each having a real part formed as a sign inversion of the real part of the complex product word and an imaginary part formed as a sign inversion of the imaginary part of the complex product word.

The embodiment of the digital correlator 400 shown as FIG. 4 includes at least one complex multiplexer 406. Each complex multiplexer 406 includes a code input for receiving a sequence of binary code states, a first input coupled to the output of the complex multiplier 402 for receiving the sequence of complex product words, and a second input coupled to the output of the complex inverter 404 for receiving the sequence of complex inverter output words. In addition, each complex multiplier 405 includes an output for producing a sequence of complex multiplexer output words formed as a replica of either the complex product word or the complex inverter output word depending on the binary code state.

An embodiment of the digital correlator 400 shown as FIG. 4 includes at least one complex accumulator 408. Each complex accumulator 408 includes an input coupled to the output of the complex multiplexer 406 for receiving the sequence of complex multiplexer output words, and an output for producing a complex accumulated sum word formed as a complex sum of a plurality of complex multiplexer output words received in sequence.

Thus, a method and apparatus for digital correlation in pseudorandom noise coded systems has been described that overcomes specific problems and accomplishes certain advantages over prior art methods. The improvements over known technology are significant. The method and apparatus compensate for the values of the relative phase difference and/or the relative amplitude ratio of the biphase modulator in the transmit path to achieve a significant improvement in the ORR performance of the PN system. Preferably, the method and apparatus also compensate for imperfections in the biphase modulator in the transmit path to further optimize the ORR performance. A digital correlator incorporates the compensating means to replace the biphase modulator(s) in the receive path(s). In PN-coded systems requiring multiple channels, with each channel responsive to a signal having a different range delay, the digital correlation technique reduces the amount of physical hardware required to partition the target detection space, thereby reducing cost and packaging size. In PN-coded systems that perform range correlation using digital circuitry, the method and apparatus perform the range correlation task and the spectral processing task concurrently, thereby reducing the size, complexity, and cost of PN coded systems, particularly in applications requiring a large number of range resolution cells. In PN-coded systems using digital Fourier Transform spectral processing, the method and apparatus allow for independently setting the attributes of an optimal number of spectral processing channels to provide fine Doppler frequency resolution at the lower end of the frequency spectrum where longer dwell times are acceptable and provide for short dwell times at the upper end of the frequency spectrum where coarser Doppler frequency resolution is acceptable.

While preferred embodiments of the present invention are described, it is contemplated that various modifications, alternatives and variations may be made thereto without departing from the spirit and scope of the present invention. Accordingly, it is intended that the invention embrace all such modifications, alternatives, and variations as fall within the spirit and scope of the claims hereinafter provided.

What is claimed is:

1. A digital correlator for a pseudorandom noise coded system comprising:

a first complex multiplier for receiving a sequence of sampled data words and a sequence of precomputed complex data words and for producing a sequence of first complex product words as a product therefrom;

a second complex multiplier coupled to the first complex multiplier, the second complex multiplier for receiving the sequence of first complex product words and a precomputed constant word and for producing a sequence of second complex product words as a product therefrom;

a complex multiplexer coupled to the first complex multiplier and to the second complex multiplier, the complex multiplexer for receiving a sequence of binary code states, the sequence of first complex product words, and the sequence of second complex product words and for producing a sequence of complex multiplexer output words formed as a replica of either the first complex product words or the second complex product words, depending on a particular binary code state; and a complex accumulator coupled to the complex multiplexer, the complex accumulator for receiving the sequence of complex multiplexer output words and for producing a complex accumulated sum word formed as a complex sum of the complex multiplexer output words.

2. A digital correlator as claimed in claim 1 wherein:
each of the sampled data words includes a real part;
each of the precomputed complex data words includes a real part and an imaginary part;
each of the first complex product words includes a real part and an imaginary part;
the precomputed constant word includes a real part; and
each of the second complex product words includes a real part and an imaginary part.

3. A digital correlator as claimed in claim 2, wherein each of the sampled data words further includes an imaginary part.

4. A digital correlator as claimed in claim 3, wherein the precomputed constant word further includes an imaginary part.

5. A pseudorandom noise coded digital correlation system, comprising:

a biphase modulator for receiving a control signal, a carrier signal, and a sequence of binary code states and for generating a transmitted signal formed by phase modulating the carrier signal responsive to the binary code state and the control signal;

a down converter coupled to the biphase modulator, the down converter for receiving the carrier signal and a received signal comprising a Doppler shifted version of the transmitted signal and for producing a baseband signal by mixing the received signal with the carrier signal;

an analog to digital converter coupled to the down converter, the analog to digital converter for receiving the baseband signal and for producing a sequence of sampled data words; and a digital correlator coupled to the analog to digital converter, the digital correlator for receiving the sequence of sampled data words and for producing complex accumulated sum words.

6. A pseudorandom noise coded digital correlation system as in claim 5 wherein the biphase modulator has two phase states, the two phase states having a relative phase difference and a relative amplitude ratio, and wherein the biphase modulator further includes a control element responsive to the control signal for adjusting the relative amplitude ratio.

7. A pseudorandom noise coded digital correlation system as in claim 5 wherein the biphase modulator has two phase states, the two phase states having a relative phase difference and a relative amplitude ratio, and wherein the biphase modulator further includes a control element responsive to the control signal for adjusting the relative phase difference.

8. A pseudorandom noise coded digital correlation system as claimed in claim 5, wherein the digital correlator comprises:

a first complex multiplier including:
  a first input for receiving the sequence of sampled data words;
  a second input for receiving a sequence of precomputed complex data words;
  an output for producing a sequence of first complex product words formed as a product of the sampled data word multiplied times the precomputed complex data word;
a second complex multiplier including:
  a first input coupled to the output of the first complex multiplier for receiving the sequence of first complex product words;
  a second input for receiving a precomputed constant word;
  an output for producing a sequence of second complex product words formed as a product of the first complex product word multiplied times the precomputed constant word;
at least one complex multiplexer including:
  a code input for receiving a delayed replica of the sequence of binary code states;
  a first input coupled to the output of the first complex multiplier for receiving the sequence of first complex product words;
  a second input coupled to the output of the second complex multiplier for receiving the sequence of second complex product words; and
  an output for producing a sequence of complex multiplexer output words formed as a replica of either the first complex product words or the second complex product words depending on the binary code state received at the code input;
at least one complex accumulator including:
  an input coupled to the output of the complex multiplexer for receiving the sequence of complex multiplexer output words; and
  an output for producing the complex accumulated sum words formed as a complex sum of a plurality of the complex multiplexer output words.

9. A pseudorandom noise coded digital correlation system as claimed in claim 8 wherein:
  each of the sampled data words includes a real part;
  each of the precomputed complex data words includes a real part and an imaginary part;
  each of the first complex product words includes a real part and an imaginary part;
  the precomputed constant word includes a real part; and
  each of the second complex product words includes a real part and an imaginary part.

10. A pseudorandom noise coded digital correlation system as in claim 9 wherein each of the sampled data words further includes an imaginary part.

11. A pseudorandom noise coded digital correlation system as in claim 10 wherein the precomputed constant word further includes an imaginary part.

12. A digital correlator for a pseudorandom noise coded system, comprising:
  a multiplier for receiving a sequence of sampled data words and a precomputed constant word and producing a sequence of product words formed as a product of the sampled data word multiplied times the precomputed constant word;
  at least one multiplexer for receiving a sequence of binary code states, the sequence of sampled data words, and the sequence of product words and for producing a sequence of multiplexer output words formed as a replica of either the sampled data words or the product words depending on a particular binary code state;
  at least one digital filter for receiving the sequence of multiplexer output words and for producing a filtered output word.

13. A digital correlator as claimed in claim 12, wherein the at least one digital filter comprises an accumulator and the filtered output word comprises a sum of a plurality of sequence of multiplexer output words.

14. A digital correlator as in claim 12 wherein:
  each of the sampled data words includes a real part; and
  the precomputed constant word includes a real part.

15. A digital correlator as in claim 14, wherein each of the sampled data words further includes an imaginary part.

16. A digital correlator as in claim 15, wherein the precomputed constant word further includes an imaginary part.

17. A pseudorandom noise coded digital correlation system, comprising:
  a biphase modulator including:
    a control signal input for receiving a control signal;
    an RF input for receiving a carrier signal;
    a code input for receiving a sequence of binary code states;
    an RF output for generating a transmitted signal formed by phase modulating the carrier signal responsive to the binary code states and responsive to the control signal;
  a down converter including:
    an RF input for receiving a received signal the received signal being a Doppler shifted version of the transmitted signal;
    an LO input for receiving the carrier signal;
    a baseband output for producing a baseband signal by means of mixing the received signal with the carrier signal;
  an analog to digital converter including:
    an analog input coupled to the baseband output of the down converter for receiving the baseband signal;
    a digital output for producing a sequence of sampled data words;
  at least one digital correlator comprising:
    a multiplier including:
      a first input for receiving the sequence of sampled data words;
      a second input for receiving a precomputed constant word;
      an output for producing a sequence of product words formed as a product of the sequence of sampled data word multiplied times the precomputed constant word;
    at least one multiplexer including:
      a code input for receiving a delayed replica of the sequence of binary code states;
      a first input coupled to the first input of the multiplier for receiving the sequence of sampled data words;
      a second input coupled to the output of the multiplier for receiving the sequence of product words;
      an output for producing a sequence of multiplexer output words formed as a replica of either the sequence of sampled data words or the product words depending on the sequence of binary code states received at the code input;
    at least one digital filter including:

an input coupled to the output of the at least one multiplexer for receiving the sequence of multiplexer output words; and an output for producing a filtered output word.

18. A pseudorandom noise coded digital correlation system as claimed in claim 17, wherein the at least one digital filter comprises an accumulator and the filtered output word comprises a complex sum of a plurality of the complex multiplexer output words.

19. A pseudorandom noise coded digital correlation system as in claim 17 wherein the biphase modulator has two phase states, the phase states having a relative phase difference and a relative amplitude ratio, and wherein the biphase modulator further includes a control element responsive to the control signal for adjusting the relative amplitude ratio.

20. A pseudorandom noise coded digital correlation system as in claim 17 wherein the biphase modulator has two phase states, the phase states having a relative phase difference and a relative amplitude ratio, and wherein the biphase modulator further includes a control element responsive to the control signal for adjusting the relative phase difference.

21. A pseudorandom noise coded digital correlation system as in claim 17 wherein:

each of the sampled data words includes a real part, and the precomputed constant word includes a real part.

22. A pseudorandom noise coded digital correlation system as in claim 21 wherein each of the sampled data words further includes an imaginary part.

23. A pseudorandom noise coded digital correlation system as in claim 21 wherein the precomputed constant word further includes an imaginary part.

24. A digital correlator for a pseudorandom noise coded system, comprising:

a complex multiplier including:

a first input for receiving a sequence of sampled data words;

a second input for receiving a sequence of precomputed complex data words;

an output for producing a sequence of first complex product words formed as a product of the sampled data words multiplied times the sequence of precomputed complex data words, forming a sequence of complex product words;

a complex inverter including:

an input coupled to the output of the complex multiplier for receiving the sequence of complex product words each having a real part and an imaginary part;

an output for producing a sequence of complex inverter output words each having a real part formed as a sign inversion of a real part of the sequence of complex product words and an imaginary part formed as a sign inversion of an imaginary part of the complex product words;

at least one complex multiplexer including:

a code input for receiving a sequence of binary code states;

a first input coupled to the output of the complex multiplier for receiving the sequence of complex product words;

a second input coupled to the output of the complex inverter for receiving the sequence of complex inverter output words;

an output for producing a sequence of complex multiplexer output words formed as a replica of either the sequence of complex product words or the complex inverter output words depending on the binary code state;

at least one complex accumulator including:

an input coupled to the output of the at least one complex multiplexer for receiving the sequence of complex multiplexer output words; and an output for producing a complex accumulated sum word formed as a complex sum of a plurality of the complex multiplexer output words.

25. A digital correlator as claimed in claim 24, wherein:

each of the sampled data words includes a real part;

each of the precomputed complex data words includes a real part and an imaginary part; and each of the sequence of complex product words includes a real part and an imaginary part.

26. A digital correlator as claimed in claim 25, wherein each of the sampled data words further includes an imaginary part.

27. A method for performing correlation digitally in a pseudorandom noise coded system, comprising the steps of:

generating a sequence of sampled data words, each including a real part;

multiplying each of the sequence of sampled data words times one of a sequence of precomputed complex data words including a real part and an imaginary part to form a sequence of first complex product words including a real part and an imaginary part;

multiplying a precomputed constant word, including a real part, times each of the first complex product words, to form a sequence of second complex product words including a real part and an imaginary part;

multiplexing between each of the sequence of first complex product words and each of the sequence of second complex product words responsive to one of a sequence of binary code states, each of the binary code states having one of two possible values, to form a sequence of complex multiplexer output words, each of the complex multiplexer output words being a replica of either the first complex product words or the second complex product words depending on a value of the binary code states; and accumulating a sum of a plurality of the complex multiplexer output words.

28. A method for performing correlation digitally as in claim 27 wherein each of the sampled data words further includes an imaginary part.

29. A method for performing correlation digitally as in claim 28 wherein the precomputed constant word further includes an imaginary part.

30. A method for performing correlation digitally in a pseudorandom noise coded system, the method comprising the steps of:

generating a sequence of sampled data words, each including a real part;

multiplying a precomputed constant word, including a real part, times each of the sampled data words to form a sequence of complex product words, wherein each of the sequence of complex product words includes a real part and an imaginary part;

multiplexing between each of the sequence of sampled data words and each of the sequence of complex product words in response to one of a sequence of binary code states to form a sequence of complex multiplexer output words, wherein each of the sequence of complex multiplexer output words comprises a replica of either a first complex product word or a second complex product word of the sequence of complex product words depending a value of a particular binary code state; and filtering the sequence of complex multiplexer output words.

31. A method for performing correlation digitally as claimed in claim 30, wherein the step of filtering comprises the step of accumulating a sum of complex multiplexer output words of the sequence of complex multiplexer output words.

* * * * *

UNITED STATES PATENT AND TRADEMARK OFFICE
CERTIFICATE OF CORRECTION

PATENT NO. : 5,646,626
DATED : July 8, 1997
INVENTOR(S) : Carl M. Willis

It is certified that error appears in the above-identified patent and that said Letters Patent is hereby corrected as shown below:

In column 16, claim 12, line 1, delete "produring" and insert --producing--.
In column 16, claim 12, line 6, delete "produring" and insert --producing--.
In column 16, claim 17, line 43, delete "produring" and insert --producing--.

Signed and Sealed this

Tenth Day of March, 1998

Attest:

BRUCE LEHMAN

Attesting Officer

Commissioner of Patents and Trademarks